United States Patent
Kim et al.

(10) Patent No.: US 7,123,653 B2
(45) Date of Patent: Oct. 17, 2006

(54) METHOD AND APPARATUS FOR BLIND DECISION FEEDBACK EQUALIZATION

(75) Inventors: Hyoung-Nam Kim, Daejon (KR); Yong Tae Lee, Daejon (KR); Seung Won Kim, Daejon (KR)

(73) Assignee: Electronics and Telecommunications Research Institute, (KR)

( * ) Notice: Subject to any disclaimer, the term of this patent is extended or adjusted under 35 U.S.C. 154(b) by 811 days.

(21) Appl. No.: 10/334,578

(22) Filed: Dec. 31, 2002

(65) Prior Publication Data

US 2003/0227968 A1 Dec. 11, 2003

(30) Foreign Application Priority Data

Jun. 11, 2002 (KR) .................. 10-2002-0032627

(51) Int. Cl.
*H03H 7/30* (2006.01)
*G06F 17/10* (2006.01)

(52) U.S. Cl. ...................... 375/232; 708/323
(58) Field of Classification Search ................ 375/233, 375/232, 231, 240, 240.01–240.07, 234, 375/229, 230; 333/18, 28 R; 708/323, 322, 708/300, 200, 100
See application file for complete search history.

(56) References Cited

U.S. PATENT DOCUMENTS

| | | | |
|---|---|---|---|
| 5,297,166 A | | 3/1994 | Batruni |
| 5,418,817 A | * | 5/1995 | Richter .................. 375/232 |
| 5,448,601 A | * | 9/1995 | Choi .................. 375/232 |
| 5,537,439 A | * | 7/1996 | Choi .................. 375/232 |
| 5,539,774 A | * | 7/1996 | Nobakht et al. .......... 375/232 |
| 6,069,917 A | | 5/2000 | Werner et al. |
| 6,421,378 B1 | * | 7/2002 | Fukuoka et al. .......... 375/229 |

FOREIGN PATENT DOCUMENTS

| | | |
|---|---|---|
| KR | 1999-0043384 | 11/1997 |
| KR | 00265058 | 6/2000 |

OTHER PUBLICATIONS

Pei et al., "Fractionally Spaced Blind Equalization Using Polyperiodic Linear Filtering", IEEE Transactions on Communications, vol. 46., No. 1, Jan. 1998,pp. 16-19.*
IEEE Transaction on Communications, vol. Com-35, No. 9, Sep. 1997, p. 877-887; Blind Equalization and Carrier Recovery Using a "Stop-and-Go" Decision-Directed Algorithm, G. Picchi, et al.
Proceedings of the IEEE, Vo. 86, No. 10, Oct. 1998, "Blind Decision Feedback Equalization for Terrestrial Television Receivers", p. 2070-2081.

* cited by examiner

*Primary Examiner*—Tesfaldet Bocure
*Assistant Examiner*—Vineeta Panwalkar
(74) *Attorney, Agent, or Firm*—Blakely Sokoloff Taylor & Zafman

(57) ABSTRACT

The present invention relates to blind decision feedback equalization. The present invention selects one of a filter signal and a quantized signal as an input signal of a feedback filter in the DFE and update the tap coefficient according to the SAG flag f[k] by including a main filtering unit, a SAG flag determining unit and a blind feedback controlling unit. The present invention prevents decrement of a performance caused by an error propagation and also improve a convergence performance in an equalization apparatus and reduce a symbol error rate (SER) at a steady state after converging. In conclusion, the present invention can be used effectively to a receiver in a digital TV, which is required the blind equalizer.

18 Claims, 6 Drawing Sheets

METHOD AND APPARATUS FOR BLIND DECISION FEEDBACK EQUALIZATION

FIELD OF THE INVENTION

The present invention relates to decision feedback equalization in digital communication systems; and, more particularly, to an apparatus and a method for blind decision feedback equalization in order to improve convergence performance of a filter and lower a symbol error rate by reducing error propagation.

DESCRIPTION OF RELATED ARTS

Generally, a symbol's pulse energy interferes to neighbor symbols due to a time dispersion effect in digital communication systems since data are transmitted in a limited band. Moreover, channels used in digital communication systems are distorted by a multipath effect, a frequency offset and a phase jitter. The above-mentioned factors of channel distortion cause interference between symbols. It is called intersymbol interference (ISI).

The time dispersion effect and the ISI are obstacles of obtaining desired data in digital communication systems since the time dispersion effect and the ISI generate symbol errors.

For compensating for the symbol errors, a channel equalizer has been used in a receiver. Moreover, since the above-mentioned factors of the symbol error are variable, an enhanced equalizer such as an adaptive equalizer has been required, wherein the enhanced equalizer adaptively updates tap coefficients according to a certain time.

FIG. 1 is a diagram for illustrating a conventional channel equalizer. Referring to FIG. 1, the conventional channel equalizer includes a digital filter 11, a detector 12, a tap coefficient update unit 13, training sequence storage 14, a statistical data calculator 15, a switch 16 and an equalizer input signal storage 17.

A receiver in a digital communication system receives a baseband signal x[k]. The baseband signal x[k] is inputted to the digital filter 11 and the equalizer input signal storage 17. The baseband signal x[k] contains noise signal that causes interference between symbols and the interference causes a channel distortion. The digital filter 11 eliminates the interference from the baseband signal x[k] and outputs a filtered signal y[k].

The detector 12 receives the filtered signal y[k] and takes the output value d[k] as a symbol value closest to y[k] in a transmit symbol constellation.

The tap coefficient update unit 13 receives data symbols required for updating tap coefficients from the digital filter unit 11 among output signals from the equalizer input signal storage 17. The tap coefficient update unit 13 also receives the y[k] and a second signal from the switch 16. The tap coefficient update unit 13 calculates a error signal based on the second signal and y[k]. After calculating the error signal, the tap coefficient update unit 13 updates the tap coefficients of the digital filter 11 based on the error signal. The second signal is selected at the switch 16 among output signals of the statistical data calculator 15, the detector 12 and the training sequence storage 14.

The training sequence storage 14 stores a training sequence predetermined at the receiver and outputs the training sequence during a training mode to the tap coefficient update unit 13.

The statistical data calculator 15 calculates a statistical error during a blind mode and outputs the statistical error to the tap coefficient update unit 13 through the switch 16.

The switch 16 selects one signal among the training sequence, the statistical data, and d[k] as a second signal according to an equalization mode and outputs a selected signal to the tap coefficient update unit 13. As mentioned above, the tap coefficient update unit 13 calculates the error signal based on the second signal and updates the tap coefficients by receiving the first data signal from the digital filter 11.

A decision feedback equalizer (DFE) has been popular to be used in a digital television receiver as a conventional channel equalizer.

An eye pattern of the. DFE's output signal in an eye diagram is usually wide-opened. A feedback filter of the decision feedback equalizer (DFE) easily eliminates the intersymbol interference (ISI) based on previously detected symbol, which is correctly chosen by the detector. As a result, noise enhancement does not happen unlike linear feedback equalization. Therefore, the DFE has been widely used.

However, if the detector decides erroneously its output due to the closed eye pattern, the detection error is accumulated by the symbol with the detection error being fed back to the feedback filter and it produces error propagation. Therefore, convergence performance is degraded and stability is not guaranteed.

For using the DFE in digital communication systems, it is important to minimize detection errors caused by the detector. Although efficiency is decreased by a training sequence, the training sequence is inserted in every predetermined interval for reducing symbol detection errors in digital communication systems.

That is, for adaptive equalization, a transmitter transmits the same training sequence as one stored in the training sequence storage 14 for a predetermined time and a receiver estimates a channel distortion by comparing the received training sequences and the stored training sequences. The time of transmitting the training sequences is a training mode.

The DFE uses outputs of the detector instead of the training sequences when there is no training sequence. As mentioned above, a scheme using the output of quantizer in order to update a tap coefficient is called a decision-directed equalization.

Although the insertion of training sequence is very important for reliable convergence of a filter, it decreases data efficiency. Therefore, very short training sequence is usually used in a common system and some of systems do not use the scheme of insertion of training sequence.

For example, in the 8-VSB system, one of 313 segments is used for the training sequence and in very-high-rate digital subscriber line (VDSL) which uses carrierless amplitude and pulse modulation method, the training sequence is not applied for transmitting and receiving data.

In most cases of using the short training sequence or in a multipath environment using long ghost such as a broadcasting channel, it often fails to open the eye pattern of filter's output. Blind equalization schemes are used for opening the eye pattern in some receiving environment such as a case that the training sequence is not enough for converging tap coefficients of the filter, a case that a time varying channel is used or a case that there is no training sequence.

Blind channel equalization methods perform channel equalization by using statistical data calculated by a statistical data calculator and signal constellation of transmitting symbols when no training sequence is used and there are many errors in output of the detector. Even when the eye pattern is seriously closed, blind channel equalization methods can assure initial convergence and compensate for channel effects Widely known blind channel equalization methods are a reduced constellation algorithm (RCA), a constant modulus algorithm (CMA), a stop-and-go (SAG) algorithm and a multimodulus algorithm (MMA). And there are enhanced dual mode methods such as a dual-mode generalized Sato algorithm, a dual-mode constant modulus algorithm, a dual-mode Godard algorithm and a stop-and-go dual-mode constant modulus algorithm.

The reduced constellation algorithm (RCA) is proposed by Y. Sato at "A method of self-recovering equalization for multilevel amplitude-modulation system", IEEE Trans. Commun., pp. 679–682, June 1975 and U.S. Pat. No. 4,227,152 on Oct. 8, 1980.

The constant modulus algorithm (CMA) is proposed by D. N. Godard at "Self-Recovering Equalization and Carrier Tracking in Two-Dimensional Data Communications Systems," in IEEE Trans. Commun., vol. 28. no. 11, pp. 1867–1875 on November 1980 and by N. K. Jablon at "Joint Blind Equalization, Carrier Recovery, and Timing Recovery for High-Order QAM Signal Constellations" in IEEE Trans. Signal Processing, vol. 40. no. 6. pp. 1383–1398 (July 1992).

The Stop-and-Go (SAG) algorithm is announced by G. Picchi at "Blind Equalization and Carrier Recovery using a "Stop-and-Go" Decision-Directed Algorithm" in IEEE Trans. Commun., vol. 35, pp. 877–887 (September 1987)

The MulitiModulus Algorithm (MMA) is published at "Blind Equalization for Broadband Access" by J. J. Werner, in IEEE Commun. Magazine, pp. 87–93 (April 1999).

The Dual-Mode Generalized Sato Algorithm and Dual-mode Constant Modulus Algorithm/Dual-mode Godard Algorithm is disclosed by Weerackody et al. at "Dual-Mode Type Algorithms for Blind Equalization", in IEEE Trans. Commun., vol. 42, no. 1, pp. 22–28 (January 1994).

The SAG DMCMA is proposed by Tseng with a title of "A Stop-and-Go Dual-Mode Algorithm for Blind Equalization", in Proc. IEEE GLOBECOM '96 vol. 2, pp. 1472–1431 (November 1996).

FIG. 2 is a diagram for showing a conventional blind channel equalizer. Referring to FIG. 2, the conventional blind channel equalizer includes a main filtering unit 21, a feedforward filter FFF 22, a feedback filter FBF 23, a detector 24 and a training sequence storage 25. Steps of updating tap coefficients in a blind decision feedback equalization method are explained in below.

At first, an input signal, a standard signal and a tap coefficient in FIG. 2 are defined as followings.

x[k]: an input signal of the main filtering unit 21 at a time k y[k]: an output signal of the main filtering unit 21 at a time k $b_i[k]$: tap coefficients of the feedforward filter 22 at a time k $a_j[k]$: tap coefficients of the feedback filter 23 at a time k The output signal of the main filtering unit 21 can be expressed as following equation.

$$y[k] = \sum_{i=0}^{N_b-1} b_i[k]x[k-i] - \sum_{j=1}^{N_a} a_j[k]d[k-j] \qquad \text{Eq. 1}$$

In Eq. 1, $N_b$ is the number of taps of the FFF 22 and $N_a$ is the number of taps of the FBF 23. d[k] is an output signal of the detector 24, which is a symbol value closest to the output signal y[k] of the main filtering unit 21 in the predetermined transmit symbol constellation.

Therefore, an error signal for updating the tap coefficient is calculated by following equation.

$$e[k] = y[k] - d[k] \qquad \text{Eq. 2}$$

According to Eq. 2, tap coefficients of the FFF 22 and the FBF 23 can be expressed as following equation.

$$b_i[k+1] = b_i[k] - \mu e[k]x[k-i], i=0,1,\ldots,N_b-1 \; a_j[k+1] = a_j[k] + \mu e[k]d[k-j], j=1,2,\ldots N_a \qquad \text{Eq. 3}$$

In Eq. 3, μ is a step size. Convergence performance and steady-state mean square error (MSE) are determined depending on μ.

The stop-and-go (SAG) algorithm turns a SAG flag on/off at each time index and decides to update tap coefficients according to a state of the SAG flag. As a result, the SAG algorithm improves a performance of equalization. In the SAG algorithm, there are various methods to decide the state of the SAG flag.

For example, the state of the SAG flag can be decided by using the below equation.

$$f[k] = \begin{cases} 1, & \text{sgn}(e[k]) = \text{sgn}(e_G[k]) \\ 0, & \text{sgn}(e[k]) \neq \text{sgn}(e_G[k]) \end{cases} \qquad \text{Eq. 4}$$

Referring to Eq. 4, if the flag is 1, the tap coefficients are updated at a corresponding time index and if the flag is 0, the tap coefficients are not updated.

In Eq. 4, e[k] is an error calculated in Eq. 2 and $e_G[k]$ is a Godard error used in the Godard algorithm. The Godard error is defined as the following equation.

$$e_G[k] = y[k](|y[k]|^2 - R_2) \qquad \text{Eq. 5}$$

In Eq. 5, $R_2$ is a constant defined as the below equation when a transmit symbol is c[k] in the. Godard algorithm.

$$R_2 = \frac{E(|c[k]|^4)}{E(|c[k]|^2)} \qquad \text{Eq. 6}$$

In Eq. 6, E(·) is an ensemble expectation value and |•| represents amplitude.

The Goardard error, $e_G[k]$ of Eq. 5 is used in Eq. 4 according to the Gordard algorithm and also, the Sato error $e_S[k]$ can be used in Eq. 4 according to the Sato algorithm. If the Sato algorithm is used, $e_S[k]$ is used instead of $e_G[k]$ in Eq. 4. The Sato error $e_S[k]$ is defined as a below equation.

$$e_S[k] = y[k] - \gamma \text{sgn}(y[k]) \qquad \text{Eq. 7}$$

γ in Eq. 7 is defined as a below equation according to the Sato algorithm.

$$\gamma = \frac{E(|c[k]|^2)}{E(|c[k]|)} \qquad \text{Eq. 8}$$

If a SAG flag f[k], which is decided according to Eq. 4, is applied to Eq. 3, the tap coefficients of the main filtering unit 21 in blind DFE using the SAG algorithm is calculated by a below equation.

$$b_i[k+1]=b_i[k]-\mu f[k]e[k]x[k-i],\ i=0, 1, \ldots, N_b-1a_j$$
$$[k+1]=a_j[k]+\mu f[k]e[k]d[k-j],\ j=1, 2, \ldots, N_a \qquad \text{Eq. 9}$$

If a conventional method SAG DMCMA is applied to the blind DFE, Eq. 9 is modified to a below equation.

$$\begin{cases} b_i[k+1] = b_i[k] - \mu f[k]e_{G,n}[k]x[k-i] \\ a_j[k+1] = a_j[k] + \mu f[k]e_{G,n}[k]d[k-i] \end{cases}, y(k) \in D_n \qquad \text{Eq. 10}$$

$$\begin{cases} b_i[k+1] = b_i[k] - \mu f[k]e_G[k]x[k-i] \\ a_j[k+1] = a_j[k] + \mu f[k]e_G[k]d[k-i] \end{cases}, y(k) \notin \bigcup D_n$$

In Eq. 10, $D_n$ is a small decision region including data points decided according to the signal constellation of modulation schemes. The small decision region includes data of n levels, wherein n in Eq. 10 is the number of level of data. For example, the 8-VSB system has 8 levels. $\cup D_n$ is an union set of $D_n$ according to n.

Also, the SAG flag f[k] of Eq. 10 can be modified from Eq. 4 to a below equation.

$$f[k] = \begin{cases} 1, \text{sgn}(e_{G,n}[k]) = \text{sgn}(e_G[k]) \\ 0, \text{sgn}(e_{G,n}[k]) \neq \text{sgn}(e_G[k]) \end{cases} \qquad \text{Eq. 11}$$

$e_{G,n}[k]$ of Eq. 10 and Eq. 11 is the Godard error in the small decision region according to the Godard algorithm and is defined as a below equation.

$$e_{G,n}[k]=y[k](|y[k]|^2-R_{2,n}) \qquad \text{Eq. 12}$$

Hereunder, steps of updating the tap coefficients by applying various blind equalization methods to the DFE are explained. The above-mentioned blind equalization methods may not overcome an error propagation problem caused by closed eye pattern in the initial state of equalization. It is because the blind equalization methods are originally based on a linear equalization apparatus.

For overcoming the error propagation problem of the DFE, inputs of a feedback filter are carefully selected and a method for updating the tap coefficients is appropriately chosen according to the inputs of the feedback filter.

In other words, several problems need to be overcame for applying the conventional blind equalization method to the DFE since the conventional blind equalization method is proposed based on the linear equalization apparatus.

At first, the output of a detector is fed back to a feedback filter of the DFE. At an initial convergence state of the DFE an eye pattern is not usually opened, which causes to increase a detection error probability. Therefore, incorrectly detected symbol by the detector may be fed back to the feedback filter of the DFE.

The SAG flag f[k] in Eq. 4 represents reliability of an equalizer's output in a corresponding time index.

That is, if the f[k] is reliable, then it means the output d[k] of the detector 24 also is reliable. Therefore, there would be no error, if the output d[k] is used for input of the FBF 23.

On the contrary, if the f[k] is not reliable, then it means the output d[k] of the detector 24 also is not reliable. Therefore, there would-be an error, if the output d[k] is used for input of the FBF 23. And the errors become accumulated (error propagation) by the feedback loop, therefore, the equalizer could not converge correctly and a symbol error rate would be increased. That is, in a case that the flag f[k] is 0, the error caused by quantization of y[k] would be generated and if d[k] is applied to the FBF 23, then a possibility of generation of error propagation would be increased too.

In conclusion, a performance of channel equalization is decreased due to a way of updating tap coefficients in the DEF of the conventional blind equalization methods.

Also, a method has not been decided for selecting an input to a feedback filter and updating the tap coefficients in the feedback filter in a case that the blind equalization methods are applied to DFE, wherein the blind equalization method is developed based on a linear equalization apparatus without equipping a feedback filter.

Moreover, in a case that the DFE uses the SAG flag f[k] to decide whether updating the tap coefficients of the FFF 22 and the FBF 23 in the main filtering unit, the conventional blind equalization methods could maintain reliable convergence by not updating the tap coefficients in a case that reliability is guaranteed. However, if SAG flag f[k] is 0, the tap coefficients are not updated and accordingly, information inputted to the DFE could not be used.

SUMMARY OF THE INVENTION

It is, therefore, an object of the present invention to provide an apparatus and method for blind decision feedback equalization in order to reducing an error propagation.

It is another object of the present invention to provide an apparatus and method for blind decision feedback equalization in order to improve convergence performance and lowering symbol error rate in a steady state.

In accordance with an aspect of the present invention, there is provided a blind decision feedback equalization apparatus including: a main filtering unit for performing a blind decision feedback equalization on a baseband signal x[k] and outputting a filtered signal y[k], wherein the k is a time index; a SAG flag determining unit for determining a SAG flag f[k] by using a Stop-And-Go (SAG) algorithm based on the filtered signal y[k] and a data symbol d[k], wherein the data symbol d[k] is generated by quantizing the filtered signal y[k]; and a blind feedback controlling unit for selecting one of the filtered signal y[k] and the detected symbol d[k] as a feedback signal according to the SAG flag f[k] and feeding the feedback signal back to the main filtering unit, wherein the main filtering unit includes a feedforward filtering unit and a feedback filtering unit and updates tap coefficients of main filtering unit according to the SAG flag f[k] and performing the blind decision feedback equalization based on the tap coefficients and the feedback signal.

In accordance with an aspect of the present invention, there is also provided a method for performing blind decision feedback equalization, including steps of: a) performing a blind decision feedback equalization on a baseband signal x[k] at a main filtering unit and outputting a filtered signal y[k]; b) determining a SAG flag f[k] based on the y[k] and a d[k] according to a stop-and-go (SAG) algorithm, wherein the d[k] is quantized data symbol; and c) feeding the y[k] or the d[k] back to the main filtering unit according to the SAG flag f[k],wherein in the step a), tap coefficients of the main filtering unit are updated to f[k] and the blind decision feedback equalization is performed based on the tap coefficients and the feedback signal.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

As a preferred embodiment of the present invention, a blind decision feedback apparatus and method applied in the 8-VSB system is explained. The 8-VSB system is the transmission standard for U.S. terrestrial digital TV. The 8-VSB system uses ±1, ±3, ±5, ±7 as 8 level signals and has one-dimensional constellation.

It is obvious to ordinary skilled person that the preferred embodiment of the present invention can be implemented not only to the 8-VSB system but also any other system for digital communication systems.

Figure 1:
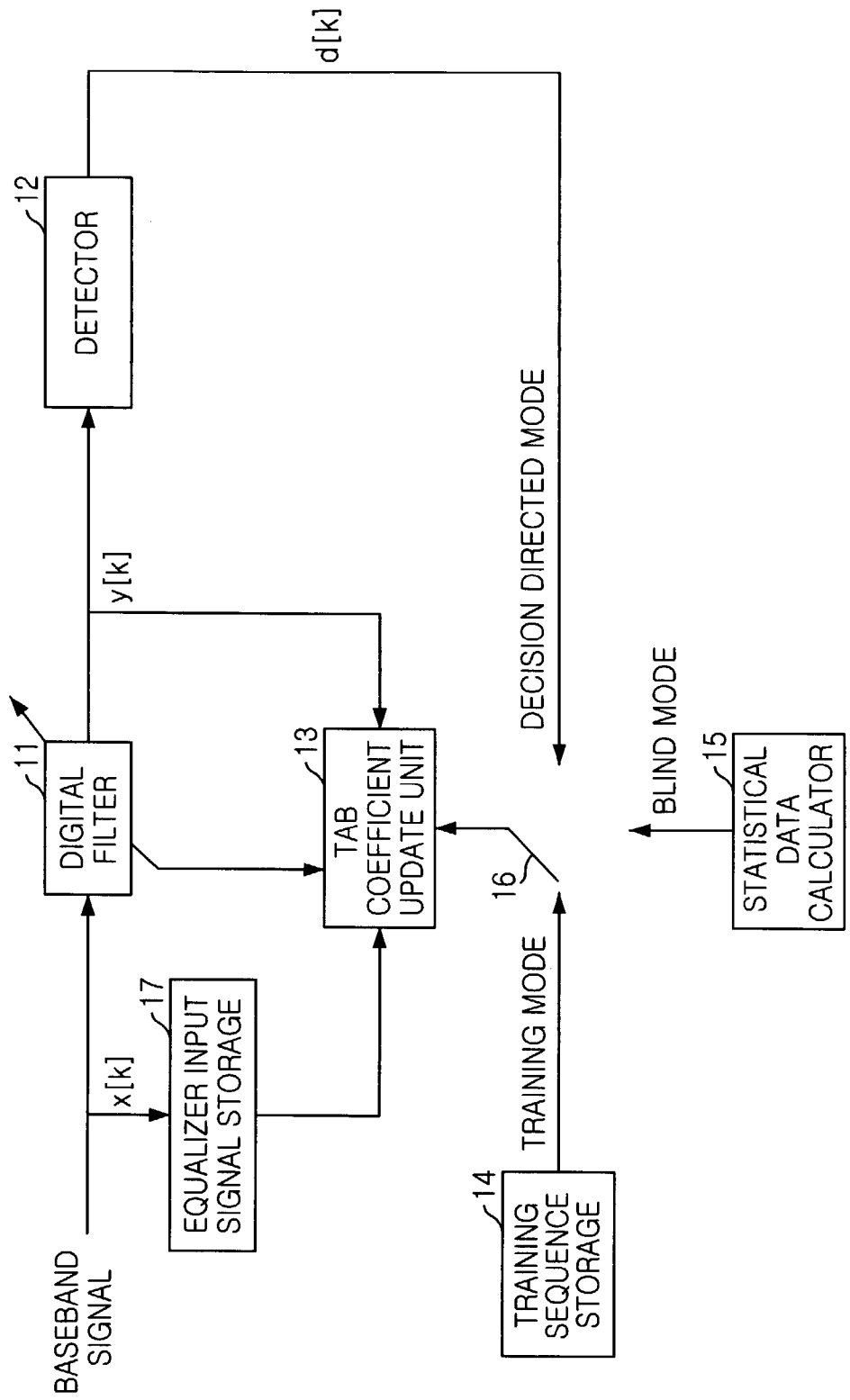
FIG. 1 is a diagram for illustrating a conventional channel equalizer.
Figure 2:
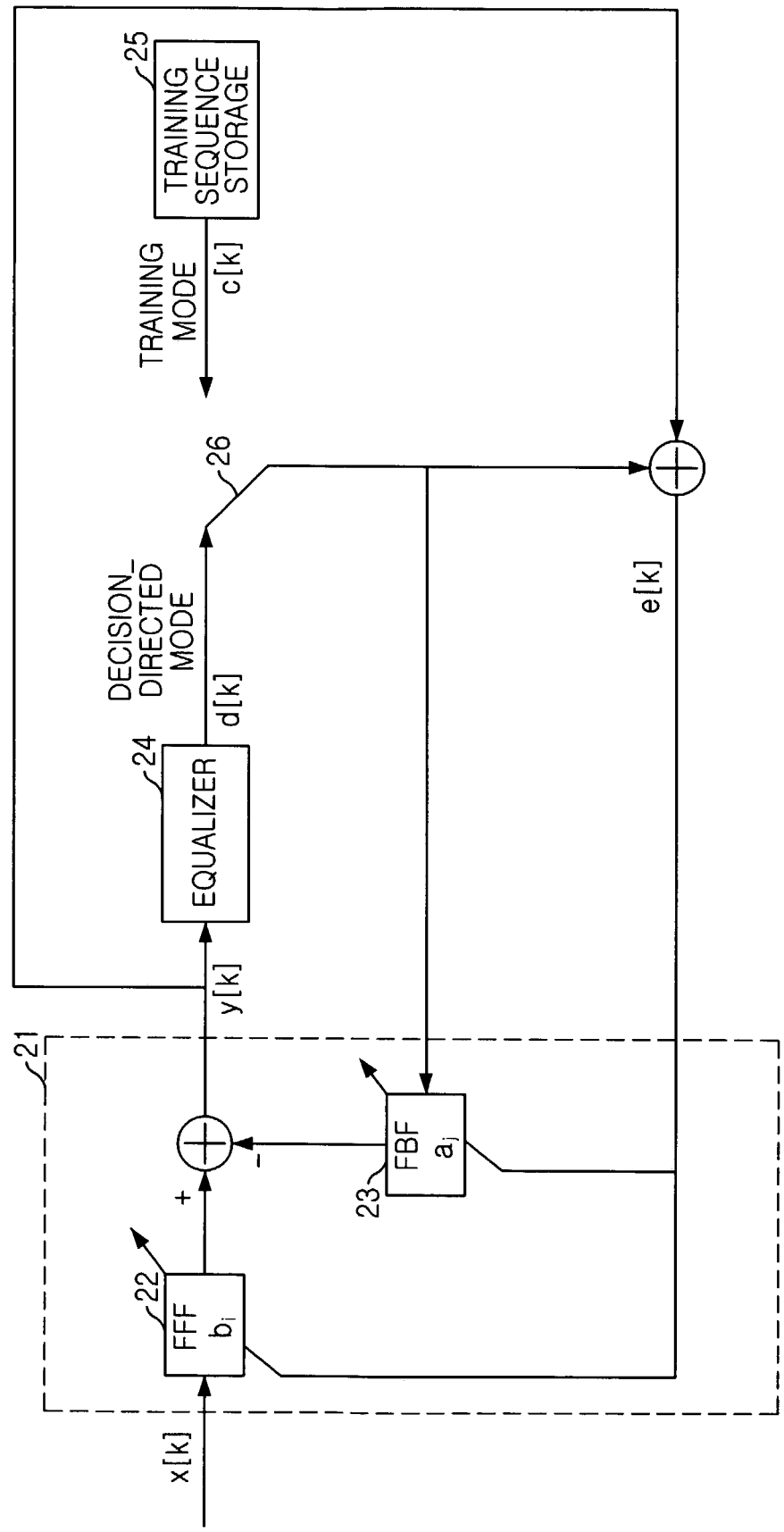
FIG. 2 is a diagram showing a conventional blind channel equalizer.
Figure 3:
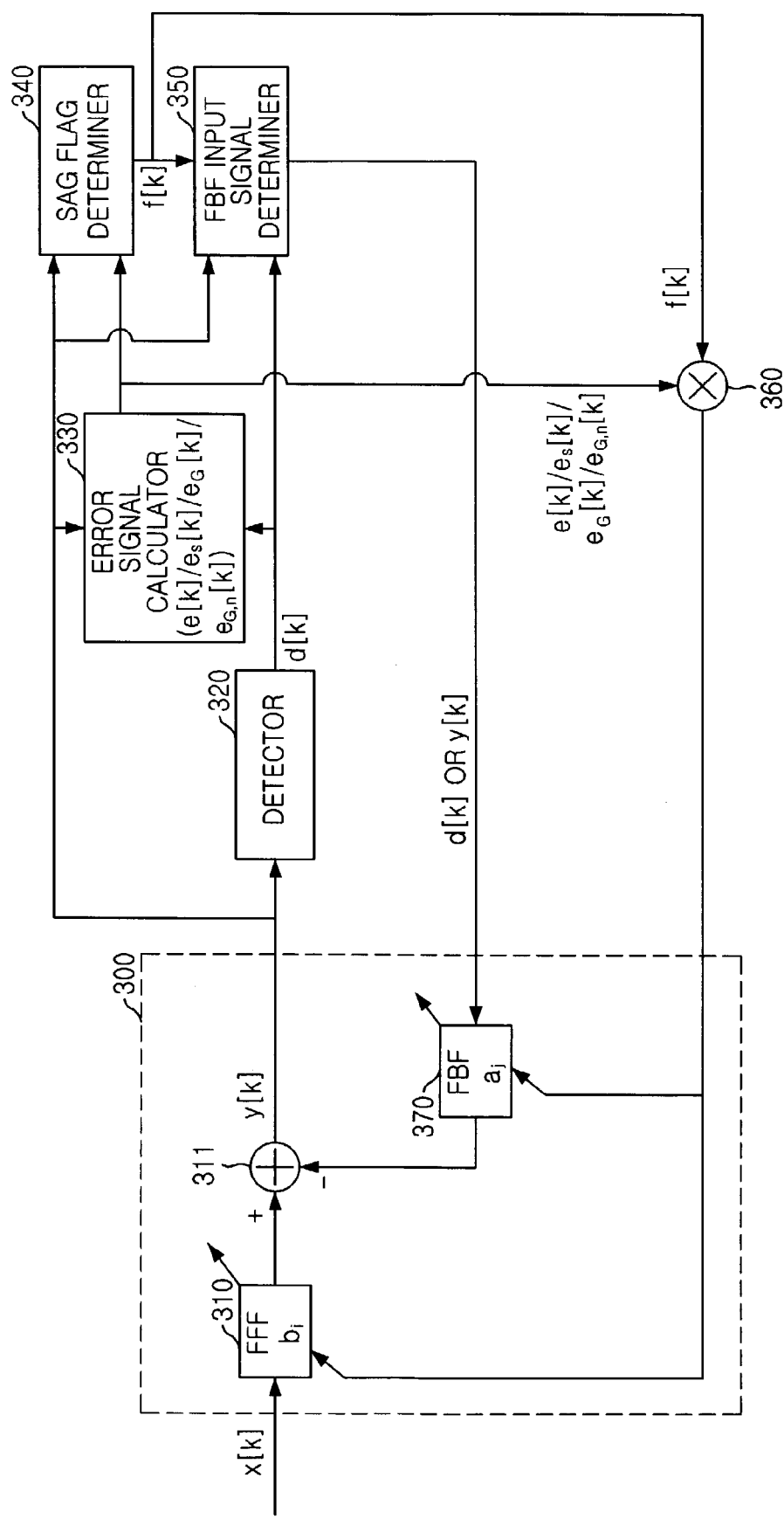
FIG. 3 is a diagram illustrating a blind decision feedback equalizer in accordance with a preferred embodiment of the present invention.

FIG. 3 is a diagram for illustrating a blind decision feedback equalizer in accordance with a preferred embodiment of the present invention. Referring to FIG. 3, the apparatus for blind decision feedback equalization includes a main filtering unit 300, a detector 320, an error signal calculator 330, a SAG flag determiner 340, a FBF input signal determiner 350 and a SAG error signal multiplayer 360.

The main filtering unit 300 includes a feedforward filter FFF 310, a feedback filter FBF 370, a calculator 311 and an updater (not shown). The main filtering unit 300 receives input signals and performs channel equalization by repeatedly filtering the input signals. The main filtering unit 300 outputs a filtered signal y[k] and the filtered signal y[k] is expressed as the below equation.

$$y[k] = \sum_{i=0}^{N_b-1} b_i[k]x[k-i] - \sum_{j=1}^{N_a} a_j[k]g[k-i] \quad \text{Eq. 13}$$

Eq. 13 is a revised equation of Eq. 1 since the input signals are modified according to the embodiment of the present invention.

g[k−j] is an input of the feedback filter, which is varied according to a SAG flag f[k], wherein the SAG flag f[k] is from Eq. 4 and Eq. 11. g[k−j] is expressed as the below equation.

$$g[k-j] = \begin{cases} d[k-f], f[k-j]=1 \\ y[k-f], f[k-j]=0 \end{cases} \quad \text{Eq. 14}$$

The detector 320 receives the filtered signal y[k]. y[k] is quantized at the detector 320 and finally the detector 320 outputs a quantized signal d[k], which is a transmit symbol closest to y[k] in the predetermined signal constellation.

The error signal calculator 330 compares the filtered signal y[k] and the quantized signal d[k] and calculates an error signal e[k] according to error signals. The error signals include, a Godard error signal $e_G[k]$ according to Eq. 5, a Sato error signal $e_S[k]$ according to Eq. 7 and error signal in a small region $e_{G,n}[k]$ according to Eq. 12.

The SAG flag determiner 340 decides the SAG flag f[k] according the SAG algorithm as like as Eq. 4 and Eq. 11 by using error signals calculated in the error signal calculator 330.

In here, the error signal calculation unit 330 and the SAG flag determiner 340 calculates the error signal based on Eq. 5, Eq. 7 or Eq. 12 and determines the SAG flag f[k] based on Eq. 4 and Eq. 11. The above mentioned calculation method is based on the SAG algorithm including the Godard algorithm and the Sato algorithm. However, it is obvious to an ordinary skilled person that the error signals and the SAG flag f[k] can be calculated and determined by various algorithms besides the SAG algorithm. Therefore, the present invention does not limit to determine the SAG flag f[k] by using only the SAG algorithm. For example, the SAG algorithm using combination of $e_G[k]$ in Eq. 5 and $e_S[k]$ in Eq. 7 is announced by D. Hatzinakos, in "Blind equalization using stop-and-go criterion adoption rules", Optica Engineering, vol. 31, pp. 1181–1198(June. 1992).

The FBF input signal determiner 350 selects an input signal between y[k] and d[k] for feeding back to the FBF 370 according to f[k]. A selection rule is specified in Eq. 14.

The updater (not shown) in the main filtering unit 300 performs updating tap coefficients based on the error signals (e[k], $e_G[k]$, $e_S[k]$, $e_{G,n}[k]$), the SAG flag f[k], a FBF input signal d[k] or f[k] and the FFF input signal.

The tap coefficients are updated in the embodiment of the present invention according to the below equations.

$$\begin{aligned} b_i[k+1] &= b_i[k] - \mu f[k]e[k]x[k-i], i=0,1,\ldots,N_b-1 a_j \\ [k+1] &= a_j[k] + \mu f[k]e[k]g[k-j], j=1, 2, \ldots, N_a \end{aligned} \quad \text{Eq. 15}$$

$$\begin{cases} b_i[k+1] = b_i[k] - \mu f[k]e_{G,n}[k]x[k-i] \\ a_j[k+1] = a_j[k] + \mu f[k]e_{G,n}[k]g[k-j] \end{cases}, y(k) \in D_n \quad \text{Eq. 16}$$

$$\begin{cases} b_i[k+1] = b_i[k] - \mu f[k]e_G[k]x[k-i] \\ a_j[k+1] = a_j[k] + \mu f[k]e_G[k]g[k-j] \end{cases}, y(k) \notin \bigcup D_n$$

Operation of the blind decision feedback equalization apparatus having the above-mentioned elements is explained in below.

Figure 4:
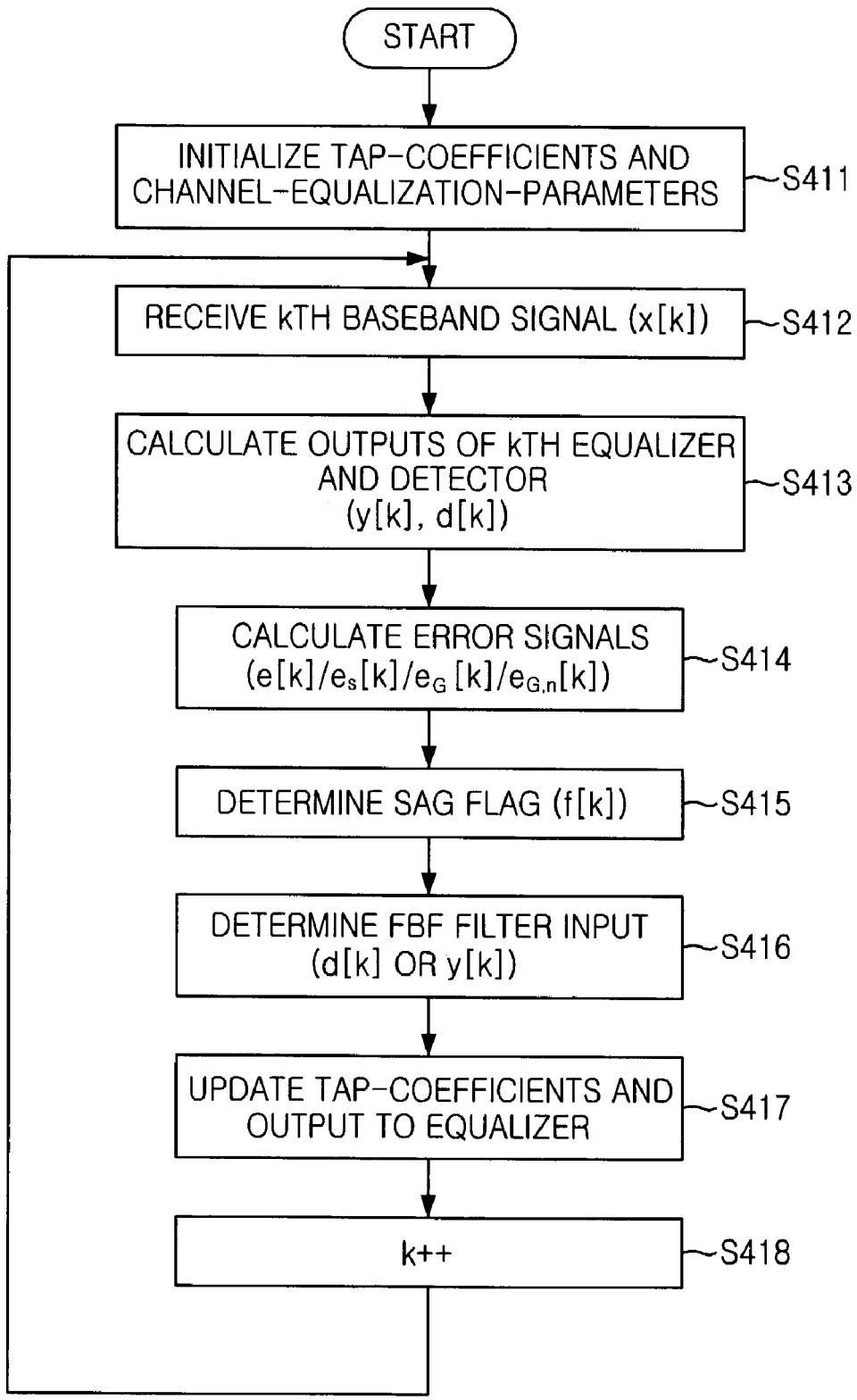
FIG. 4 is a flowchart for explaining a method for blind decision feedback equalization in accordance with a preferred embodiment of the present invention.

FIG. 4 is a flowchart explaining a method for blind decision feedback equalization in accordance with a preferred embodiment of the present invention. Referring to FIG. 4, a main filtering unit 300 initializes tap coefficients and parameters related to channel equalization at step 411. The parameters related to the channel equalization are pre-determined and inputted to the main filtering unit 300. The parameters contain a step size μ for determining convergence speed and steady-sated mean square error (MSE) and constants required for computing the Godard or Sate errors, etc. And the main filtering unit 300 sets a time index k as 1.

At step 412, x[k] is inputted to the main filtering unit 300, wherein the x[k] is a $k^{th}$ baseband signal received at a receiver. The main filtering unit 300 outputs y[k] generated based on Eq. 13 and the detector 320 outputs a symbol d[k] decided by searching a symbol closest to y[k] in a predetermined transmit symbol constellation at step 413. The error signal calculator 330 calculates an error signal e[k] according to Eq. 2, a Godard error signal $e_G[k]$ according to Eq. 5, a Sato error signal $e_S[k]$ according to Eq. 7 and an error signal $e_{G,n}[k]$ of a small region according to Eq. 12 at step 414. The above-mentioned error signals are outputted from the error signal calculator at step 414.

The SAG flag determiner 340 outputs a SAG flag f[k] at step 415. For example, the SAG flag f[k] is calculated based on Eq. 4 and Eq. 11 by using the SAG algorithm.

In here, the error signal calculation unit 330 and the SAG flag determiner 340 calculates the error signal based on Eq. 5, Eq. 7 or Eq. 12 and determines the SAG flag f[k] based on Eq. 4 and Eq. 11. The above mentioned calculation method is based on the SAG algorithm including the Godard algorithm and the Sato algorithm. However, it is obvious to an ordinary skilled person that the error signals and the SAG flag f[k] can be calculated and determined by various algorithms besides the SAG algorithm. Therefore, the present invention does not limit to determine the SAG flag f[k] by using only the SAG algorithm. For example, the SAG algorithm using combination of $e_G[k]$ in Eq. 5 and $e_S[k]$ in Eq. 7 is announced by D. Hatzinakos, in "Blind equalization using stop-and-go criterion adoption rules", Optical Engineering, vol. 31, pp. 1181–1198(June. 1992).

The FBF determiner 350 selects one of y[k] and d[k] as an input signal for feeding the input signal back to the FBF 370 of the main filtering unit 300 according to f[k] of the SAG flag determiner 340 at step 416. A selection rule is specified in Eq. 14.

After step 416, the updater (not shown) in the main filtering unit 300 updates the tap coefficients according to Eq. 15 or Eq. 16 (in case of the SAG DMCMA applied) based on the error signals (e[k], $e_G[k]$, $e_S[k]$, $e_{G,n}[k]$), the SAG flag (f[k]), and the input symbol of the FBF (d[k], y[k]) and input signals of the FFF (x[k], f[k]e[k]/f[k]$e_G$[k]/f−k) $e_{G,n}$[k]). After updating tap coefficients, the updated coefficients are applied to two filters FFF 310 and FBF 370 at step 417. The FFF 310 and FBF 370 outputs a signal y[k+1] by filtering a baseband signal x[k+1] according to Eq. 13 based on updated tap coefficients $a_j$[k+1] and $b_i$[k+1].

That is, if the blind channel equalization of $k^{th}$ time index is finished through the above-mentioned steps, the time index k is increased by 1 at step 418 and steps 412 to 418 are repeated for performing $(k+1)^{th}$ blind channel equalization.

By performing the above-mentioned steps, the error propagation may be decreased and accordingly, convergence performance is increased and a symbol error rate in a steady state would be decreased.

Figure 5:
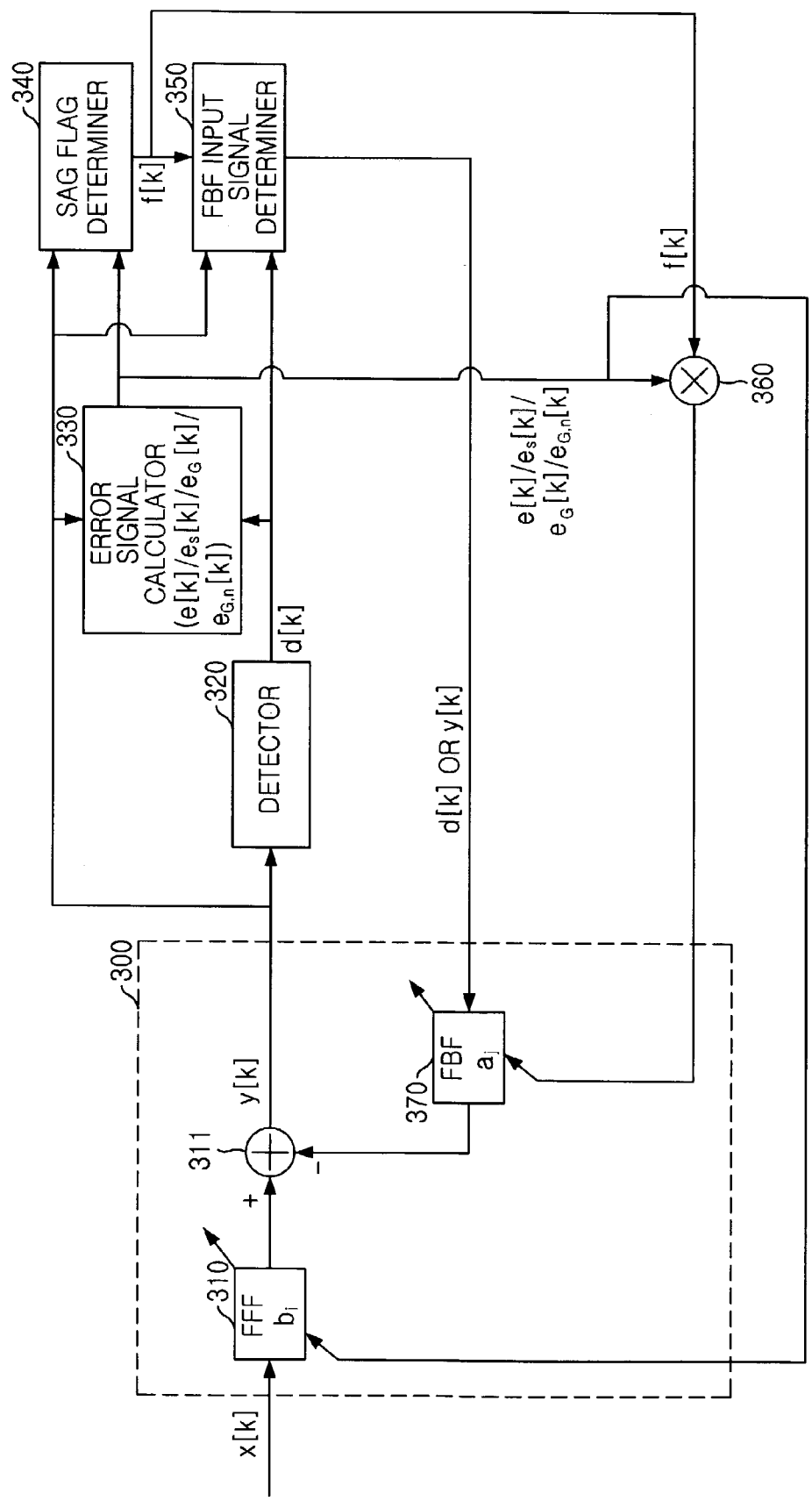
FIG. 5 is a diagram showing a blind decision feedback equalization apparatus in accordance with another embodiment of the present invention.

FIG. 5 is a diagram illustrating a blind decision feedback equalization apparatus in accordance with another embodiment of the present invention. In the conventional blind feedback equalization apparatus, if a SAG flag f[k] is 0, the tap coefficients are not updated and accordingly, information inputted to the DFE could not be used. The embodiment of FIG. 5 is a blind decision feedback equalization apparatus can overcome the above-mentioned problem.

Referring to FIG. 5, a blind decision feedback equalization apparatus includes identical elements and each elements performance same function comparing to the blind feedback equalization apparatus in FIG. 3 except a feedforward filter FFF 310 in FIG. 5. The blind feedback equalization apparatus in FIG. 5 is constructed in order to that the FFF 310 always updates tap coefficients without considering a SAG flag f[k].

The FFF 310 receives error signals (e[k], $e_S$[k], $e_G$[k], $e_{G,n}$[k]) and a baseband signal x[k] and updates always the tap coefficients irrespective of the SAG flag f[k].

A feedback filter FBF 370 in FIG. 5 receives a data symbol d[k] quantized by a detector 320 or a filtered signal y[k], according to a SAG flag f[k]. That is, if the SAG flag f[k] is 0, then the y[k] is inputted to the FBF 370 and the FBF 370 does not update the tap coefficients and if the SAG flag f[k] is 1, the d[k] is inputted to the FBF 370 and the tap coefficients are updated.

When the FBF input signal determiner is not activated, updating the tap coefficients of the FFF 310 and FBF 370 can be expressed as the below equation.

$$\begin{cases} b_i[k+1] = b_i[k] - \mu e_{G,n}[k]x[k-i] \\ a_j[k+1] = a_j[k] + \mu f[k]e_{G,n}[k]d[k-j] \end{cases}, y(k) \in D_n \quad \text{Eq. 17}$$

$$\begin{cases} b_i[k+1] = b_i[k] - \mu e_G[k]x[k-i] \\ a_j[k+1] = a_j[k] + \mu f[k]e_G[k]d[k-j] \end{cases}, y(k) \notin \bigcup D_n$$

When the FBF input signal determiner is activated, updating the tap coefficients of the FFF 310 and FBF 370 can be expressed as the below equation.

$$\begin{cases} b_i[k+1] = b_i[k] - \mu e_{G,n}[k]x[k-i] \\ a_j[k+1] = a_j[k] + \mu f[k]e_{G,n}[k]g[k-j] \end{cases}, y(k) \in D_n \quad \text{Eq. 18}$$

$$\begin{cases} b_i[k+1] = b_i[k] - \mu e_G[k]x[k-i] \\ a_j[k+1] = a_j[k] + \mu f[k]e_G[k]g[k-j] \end{cases}, y(k) \notin \bigcup D_n$$

As mentioned above, the blind decision feedback equalization apparatus in FIG. 5 includes the FFF 310 for always updating the tap coefficients without considering the SAG flag f[k] and the FBF 370 for controlling to update the tap coefficients according to the SAG flag f[k]. In other words, the FBF 370 only updates the tap coefficients based on the d[k] when the SAG flag f[k] is 1. As a result, the error propagation would be reduced and accordingly, convergence performance would be improved and a symbol error rate in the steady state after converging would be decreased too.

Figure 6:
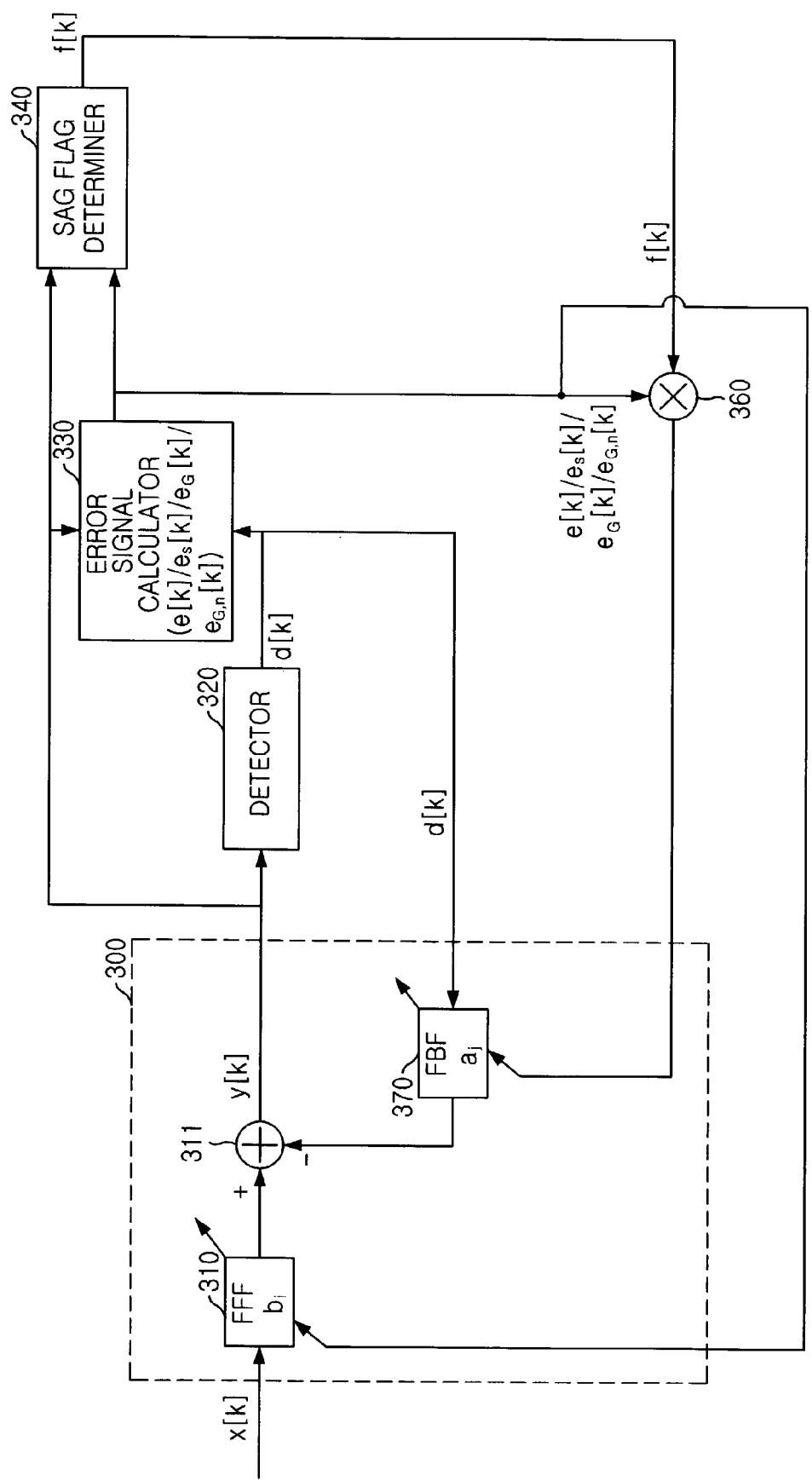
FIG. 6 is a diagram illustrating a blind decision feedback equalization apparatus in accordance with still another embodiment of the present invention.

FIG. 6 is a diagram illustrating a blind decision feedback equalization apparatus in accordance with still another embodiment of the present invention. The embodiment of FIG. 6 is a blind decision feedback equalization apparatus can improve convergence performance.

Referring to FIG. 6, the blind decision feedback equalization apparatus includes identical elements and each elements performance same function comparing to the blind feedback equalization apparatus in FIG. 3 except a feed back filter FBF 370 always receives a quantized signal d[k]. There is no FBF input signal determiner 350 of FIG. 5 in FIG. 6. The blind feedback equalization apparatus in FIG. 6 is constructed in order to that the FBF 310 always receives the quantized signal d[k] without considering a SAG flag f[k].

The FFF 310 receives error signals (e[k], $e_S[k]$, $e_G[k]$, $e_{G,n}[k]$) and a baseband signal x[k] and updates always the tap coefficients irrespective of the SAG flag f[k].

The feedback filter FBF 370 receives a data symbol d[k] quantized by a detector 320 and if the SAG flag f[k] is 0, then the FBF 370 does not update the tap coefficients and if the SAG flag f[k] is 1, the tap coefficients are updated.

Updating the tap coefficients of the FFF 310 and FBF 370 in FIG. 6 can be expressed as the below equation.

$$\begin{cases} b_i[k+1] = b_i[k] - \mu e_{G,n}[k]x[k-i] \\ a_j[k+1] = a_j[k] + \mu f[k]e_{G,n}[k]d[k-j] \end{cases}, y(k) \in D_n \quad \text{Eq. 19}$$

$$\begin{cases} b_i[k+1] = b_i[k] - \mu e_G[k]x[k-i] \\ a_j[k+1] = a_j[k] + \mu f[k]e_G[k]d[k-j] \end{cases}, y(k) \notin \bigcup D_n$$

As mentioned above, the blind decision feedback equalization apparatus in FIG. 6 includes the FFF 310 always updating the tap coefficients without considering the SAG flag f[k] and the FBF 370 receiving the quantized signal d[k]. In other words, the FFF 310 always updates the tap coefficients and the FBF 370 only updates the tap coefficients when the SAG flag f[k] is 1 and always receives the d[k]. As a result, convergence performance would be improved and a symbol error rate in the steady state.

It is obvious to an ordinary skilled person that the above mentioned embodiments of the present invention can be implemented not only to the DFE with the SAG DMCMA implemented but also any other blind decision feedback apparatus and methods. In the specification, the DFE with the SAG DMCMA implemented is used as an example for explaining the embodiments of the present invention and it is not limited to a scope of implementation of the present invention.

The above-mentioned present invention selects one of a filtered signal and a detected signal as an input signal of a feedback filter in the DFE, therefore, it reduces performance degradation caused by error propagation. Accordingly, the present invention can also improve convergence performance in an equalization apparatus and reduce a symbol error rate (SER) at the steady state after converging.

In conclusion, the present invention can be used effectively to a receiver in a digital TV, which is required the blind equalizer.

While the present invention has been described with respect to certain preferred embodiments, it will be apparent to those skilled in the art that various changes and modifications may be made without departing from the scope of the invention as defined in the following claims.

What is claimed is:

1. A blind decision feedback equalization apparatus, comprising:

main filtering means for performing a blind decision feedback equalization on a baseband signal x[k] and outputting a filtered signal y[k], wherein the k is a time index;

SAG flag determining means for determining a SAG flag f[k] by using a Stop-And-Go (SAG) algorithm based on the filtered signal y[k] and a detected symbol d[k], wherein the detected symbol d[k] is generated by quantizing the filtered signal y[k]; and blind decision feedback controlling means for selecting one of the filtered signal y[k] and the detected symbol d[k] as a feedback signal according to the SAG flag f[k] and feeding the feedback signal back to the main filtering means, wherein the main filtering means includes a feedforward filtering means and a feedback filtering means and updates tap coefficients of main filtering means according to the SAG flag f[k] and performing the blind decision feedback equalization based on the tap coefficients and the feedback signal.

2. The apparatus as recited in the claim 1, wherein the blind decision feedback controlling means feeds back the data symbol d[k] to the feedback filtering means in a case that the SAG flag f[k] is 1 and feeds back the filtered signal y[k] to the feedback filtering means in a case that the SAG flag f[k] is 0.

3. The apparatus as recited in claim 1, wherein the feedback filtering means has a tap coefficient $a_j[k]$ and $N_a$ as the number of taps and the feedforward filtering means has $b_i[k]$ as tap coefficients and $N_b$ as the number of taps, wherein the filtered signal y[k] is expressed by an equation as:

$$y[k] = \sum_{i=0}^{N_b - 1} b_i[k]x[k-i] - \sum_{j=1}^{N_a} a_j[k]g[k-j],$$

where the g[k−j] is the feedback signal decided by an equation as:

$$g[k-j] = \begin{cases} d[k-j], & f[k-j] = 1 \\ y[k-j], & f[k-j] = 0 \end{cases}$$

4. The apparatus as recited in claim 3, wherein the feedforward filtering means and the feedback filtering means update the tap coefficients when the f[k] is 1 and tap coefficient updating is performed according to equation $$b_i[k+1] = b_i[k] - \mu f[k]e[k]x[k-i], i = 0, 1, \ldots, N_b - 1$$
$$a_j[k+1] = a_j[k] + \mu f[k]e[k]g[k-j], j = 1, 2, \ldots, N_a$$

where μ is a step size that determines a mean square error (MSE) at the steady normal state and a convergence speed of the blind decision feedback equalization apparatus and e[k] is an error signal calculated based on y[k] or d[k].

5. The apparatus as recited in claim 3, the feedforward filtering means and the feedback filtering means, in case of stop and go Dual-mode Constant Modulus Algorithm (SAG DMCMA) is applied to the blind decision feedback equalization apparatus, update the tap coefficients when the f[k] is 1 and does not update the tap coefficients when the f[k] is 0 according to an equation as:

$$\begin{cases} b_i[k+1] = b_i[k] - \mu f[k]e_{G,n}[k]x[k-i] \\ a_j[k+1] = a_j[k] + \mu f[k]e_{G,n}[k]g[k-j] \end{cases}, y(k) \in D_n$$

$$\begin{cases} b_i[k+1] = b_i[k] - \mu f[k]e_G[k]x[k-i] \\ a_j[k+1] = a_j[k] + \mu f[k]e_G[k]g[k-j] \end{cases}, y(k) \notin \bigcup D_n$$

where $e_G[k]$ and $e_{G,n}[k]$ are error signals calculated based on y[k] or d[k], $D_n$ is a small region including data points, which is decided by a constellation of a modulation scheme and n is the number of data level.

6. The apparatus as recited in claim 3, wherein the feedforward filtering means always updates the tap coefficients without considering the f[k] and the feedback filtering means updates the tap coefficients when the f[k] is 1.

7. The apparatus as recited in claim 6, wherein the feedforward filtering means and the feedback filtering means update the tap coefficients according to equations $$\begin{cases} b_i[k+1] = b_i[k] - \mu e_{G,n}[k]x[k-i] \\ a_j[k+1] = a_j[k] + \mu f[k]e_{G,n}[k]g[k-j] \end{cases}, y(k) \in D_n$$

$$\begin{cases} b_i[k+1] = b_i[k] - \mu e_G[k]x[k-i] \\ a_j[k+1] = a_j[k] + \mu f[k]e_G[k]g[k-j] \end{cases}, y(k) \notin \bigcup D_n$$

where $e_G[k]$ and $e_{G,n}[k]$ are error signals calculated based on y[k] and/or d[k], $D_n$ is a small decision region including data points decided according to a constellation of a modulation scheme, n is the number of data levels, $a_j[k]$ is a tap coefficient of the feedback filter and $b_j[k]$ is a tap coefficient of the feedforward filter.

8. A bind decision feedback equalization apparatus, comprising:
   main filtering means for performing a blind decision feedback equalization on a baseband signal x[k] and outputting a filtered signal y[k], wherein the k is a time index; and
   SAG flag determining means for determining a SAG flag f[k] by using a Stop-And-Go (SAG) algorithm based on the filtered signal y[k] and a detected symbol d[k], wherein the detected symbol d[k] is generated by quantizing the filtered signal y[k];
   Wherein the main filtering means includes a feedforward filtering means for always updating tap coefficients without considering the SAG flag f[k] and a feedback filtering means for receiving only the detected symbol d[k] and updating tap coefficients when the SAG flag f[k] is 1 and not updating tap coefficients when the SAG flag f[k] is 0.

9. The apparatus as recited in claim 8, wherein the feedforward filtering means and the feedback filtering means update the tap coefficients according to equations $$\begin{cases} b_i[k+1] = b_i[k] - \mu e_{G,n}[k]x[k-i] \\ a_j[k+1] = a_j[k] + \mu f[k]e_{G,n}[k]d[k-j] \end{cases}, y(k) \in D_n$$

$$\begin{cases} b_i[k+1] = b_i[k] - \mu e_G[k]x[k-i] \\ a_j[k+1] = a_j[k] + \mu f[k]e_G[k]d[k-j] \end{cases}, y(k) \notin \bigcup D_n$$

where $e_G[k]$ and $e_{G,n}[k]$ are error signals calculated based on y[k] and/or d[k], $D_n$ is a small decision region including data points decided according to a constellation of a modulation scheme, n is the number of data levels, $a_j[k]$ is a tap coefficient of the feedback filter and $b_j[k]$ is a tap coefficient of the feedforward filter.

10. A method for performing blind decision feedback equalization, comprising steps of:
   a) performing blind decision feedback equalization on a baseband signal x[k] at a main filtering means and outputting a filtered signal y[k];
   b) determining a SAG flag f[k] based on the y[k] and the d[k] according to a stop-and-go (SAG) algorithm, wherein the d[k] is quantized data symbol; and
   c) feeding the y[k] or the d[k] back to the main filtering means according to the SAG flag f[k],
   wherein in the step a), tap coefficients of the main filtering means is updated according to f[k] and the blind decision feedback equalization is performed based on the tap coefficients and the feedback signal.

11. The method as recited in claim 10, wherein in the step c), the d[k] is fed back to the main filtering means when the f[k] is 1 and feeds the y[k] back to the main filtering means when the f[k] is 0.

12. The method as recited in claim 10, wherein in the step a), the y[k] is calculated by an equation as:

$$y[k] = \sum_{i=0}^{N_b-1} b_i[k]x[k-i] - \sum_{j=1}^{N_a} a_j[k]g[k-j],$$

where $N_a$ is the number of taps of the feedback filter and $N_b$ is the number of taps of the feedforward filter.

13. The method as. recited in claim 10, the feedforward filtering means and the feedback filtering means for updating the tap coefficients when the f[k] is 1 according to an equation as:

$$b_i[k+1] = b_i[k] - \mu f[k]e[k]x[k-i], i = 0, 1, \ldots, N_b - 1$$
$$a_j[k+1] = a_j[k] + \mu f[k]e[k]g[k-j], j = 1, 2, \ldots, N_a$$

where μ is a step size that determines a mean square error (MSE) at the steady normal state and a convergence speed of the blind decision feedback equalization apparatus and e[k] is an error signal calculated based on y[k] or d[k].

14. The method as recited in claim 10, the feedforward filtering means and the feedback filtering means, in case of the SAG DMCMA is applied to the blind decision feedback equalization apparatus, update the tap coefficients according to an equation as:

$$\begin{cases} b_i[k+1] = b_i[k] - \mu f[k]e_{G,n}[k]x[k-i] \\ a_j[k+1] = a_j[k] + \mu f[k]e_{G,n}[k]g[k-j] \end{cases}, y(k) \in D_n$$

$$\begin{cases} b_i[k+1] = b_i[k] - \mu f[k]e_G[k]x[k-i] \\ a_j[k+1] = a_j[k] + \mu f[k]e_G[k]g[k-j] \end{cases}, y(k) \notin \bigcup D_n$$

where $e_{G,n}[k]$ and $e_G[k]$ are error signals calculated based on y[k] or d[k], $D_n$ is a small region including data points, which is decided by a constellation of transmit method and n is the number of data level.

15. The apparatus as recited in claim 10, wherein the tap coefficients are updated in the feedforward filtering means without considering the f[k] and the tap coefficients are updated in the feedback filtering means when the f[k] is 1.

16. The method as recited in claim 15, wherein the feedforward filtering means and the feedback filtering means update the tap coefficients of the main filtering means according to equations as:

$$\begin{cases} b_i[k+1] = b_i[k] - \mu e_{G,n}[k]x[k-i] \\ a_j[k+1] = a_j[k] + \mu f[k]e_{G,n}[k]g[k-j] \end{cases}, y(k) \in D_n$$

$$\begin{cases} b_i[k+1] = b_i[k] - \mu e_G[k]x[k-i] \\ a_j[k+1] = a_j[k] + \mu f[k]e_G[k]g[k-j] \end{cases}, y(k) \notin \bigcup D_n$$

where $e_G[k]$ and $e_{G,n}[k]$ are error signals calculated based on $y[k]$ and/or $d[k]$, $D_n$ is a small decision region including data points decided according to a constellation of a modulation scheme, n is the number of data levels, $a_j[k]$ are tap coefficients of the feedback filter and $b_j[k]$ are tap coefficients of the feedforward filter.

17. A method for performing blind decision feedback equalization, comprising steps of:
   a) performing a blind decision feedback equalization on a baseband signal $x[k]$ at a main filtering means and outputting a filtered signal $y[k]$;
   b) determining a SAG flag $f[k]$ based on the $y[k]$ and the $d[k]$ according to a stop-and-go (SAG) algorithm, wherein the $d[k]$ is quantized data symbol; and
   c) feeding the $d[k]$ back to the feedback filtering means in the main filtering means, wherein in the step a), the feedforward filtering means always update tap coefficients without considering a SAG flag $f[k]$ and the feedback filtering means update tap coefficients when the SAG flag $f[k]$ is 1 and does not update tap coefficients when the SAG flag $f[k]$ is 0.

18. The method as recited in claim 17, wherein in the step a), the feedforward filtering means and the feedback filtering means update the tap coefficients according to $$\begin{cases} b_i[k+1] = b_i[k] - \mu e_{G,n}[k]x[k-i] \\ a_j[k+1] = a_j[k] + \mu f[k]e_{G,n}[k]g[k-j] \end{cases}, y(k) \in D_n$$

$$\begin{cases} b_i[k+1] = b_i[k] - \mu e_G[k]x[k-i] \\ a_j[k+1] = a_j[k] + \mu f[k]e_G[k]g[k-j] \end{cases}, y(k) \notin \bigcup D_n$$

where $e_G[k]$ and $e_{G,n}[k]$ are error signals calculated based on $y[k]$ and/or $d[k]$, $D_n$ is a small decision region including data points decided according to a constellation of a modulation scheme, n is the number of data levels, $a_j[k]$ is a tap coefficient of the feedback filter and $b_j[k]$ is a tap coefficient of the feedforward filter.

\* \* \* \* \*